(12) United States Patent
Fujikawa et al.

(10) Patent No.: US 6,956,367 B2
(45) Date of Patent: Oct. 18, 2005

(54) BEARING ASSEMBLY EQUIPPED WITH ROTATION SENSOR TO DETERMINE ROTATION AND POSITION OF ROTATING ELEMENT

(75) Inventors: Yoshio Fujikawa, Iwata (JP); Toru Takahashi, Iwata (JP); Yoshitaka Nagano, Iwata (JP); Takashi Koike, Iwata (JP) x; Kenichi Iwamoto, Iwata (JP)

(73) Assignee: NTN Corporation, Osaka (JP)

( * ) Notice: Subject to any disclaimer, the term of this patent is extended or adjusted under 35 U.S.C. 154(b) by 272 days.

(21) Appl. No.: 10/387,563

(22) Filed: Mar. 14, 2003

(65) Prior Publication Data

US 2003/0173956 A1    Sep. 18, 2003

(30) Foreign Application Priority Data

Mar. 15, 2002 (JP) .............................. 2002-072050

(51) Int. Cl.[7] .............................................. G01B 7/30
(52) U.S. Cl. ............................. 324/207.22; 324/207.2; 324/165; 324/207.25
(58) Field of Search ................................ 324/165, 173, 324/174, 178, 179, 207.2, 207.22, 207.25; 384/448

(56) References Cited

U.S. PATENT DOCUMENTS 4,364,011 A  * 12/1982 Bloomfield et al. ........ 324/174
4,533,902 A  *  8/1985 Baker et al. .................... 341/9
5,744,720 A  *  4/1998 Ouchi ....................... 73/514.39
6,498,474 B1 * 12/2002 Turner ......................... 324/165

* cited by examiner

Primary Examiner—Jay Patidar

(57) ABSTRACT

To provide a compact bearing assembly equipped with a rotation sensor capable of detecting not only pulse signals for detecting the number of revolution, but also a home position signal, the bearing assembly equipped with the rotation sensor includes a rotatable member (2) and a non-rotatable member (3) with rolling elements (4) interposed between the rotatable and non-rotatable members (2) and (3) to permit the rotatable member (2) to be rotatable relative to the non-rotatable member (3). The rotatable member (2) is provided with a magnetic encoder (7) and the non-rotatable member (3) is provided with magnetic sensors (8A) to (8C). The magnetic encoder (7) includes first and second to-be-detected elements (7A) and (7B) each having a plurality of equally spaced, opposite magnetic poles defined therein so as to alternate with each other in a direction circumferentially thereof. The first to-be-detected element also has a magnetic characteristic disturbing element (15) provided at a predetermined site on a circumference of the magnetic encoder (7) for agitating a periodicity of the opposite magnetic poles. The two magnetic sensors (8A) and (8B) for detecting the first to-be-detected element (7A) are spaced in a circumferential direction a distance greater than a circumferentially extending width of the disturbing element (15), and are so positioned as to be held in substantially phase-matched relation with a cycle of repetition of the opposite magnetic poles.

13 Claims, 7 Drawing Sheets

Fig. 4
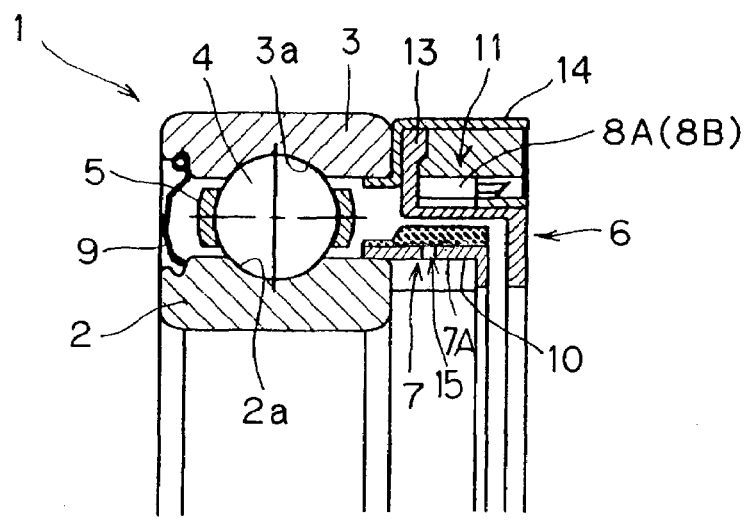
Fig. 5
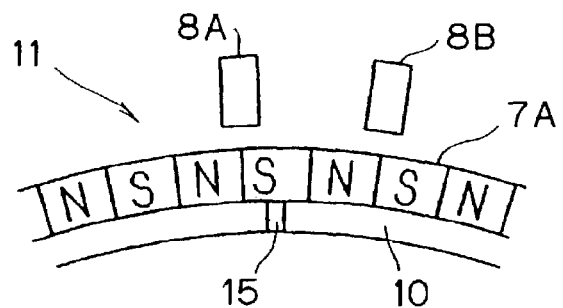
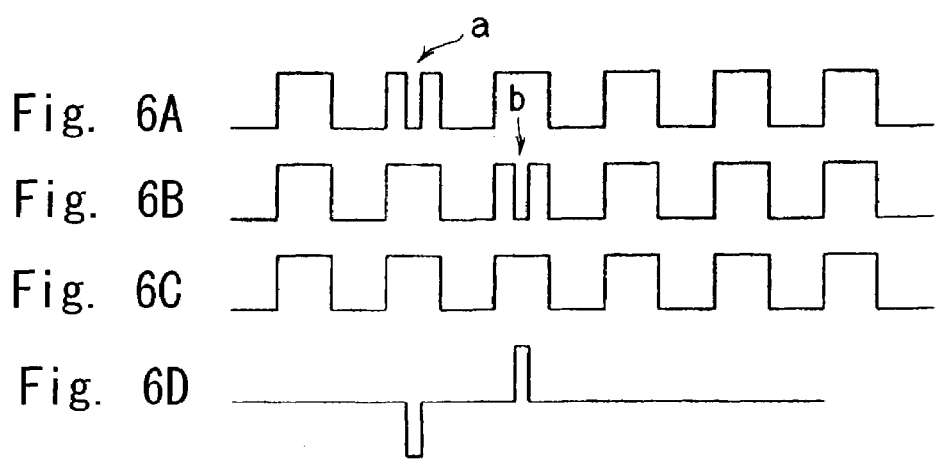

Fig. 7
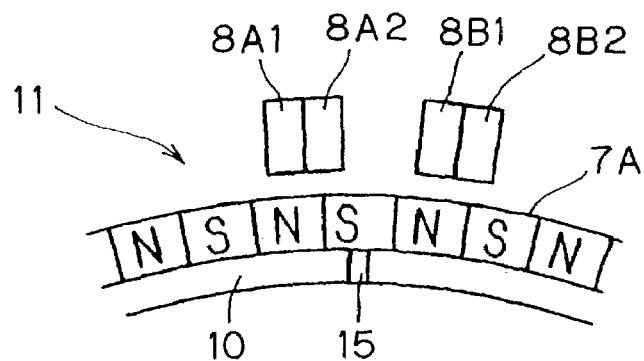
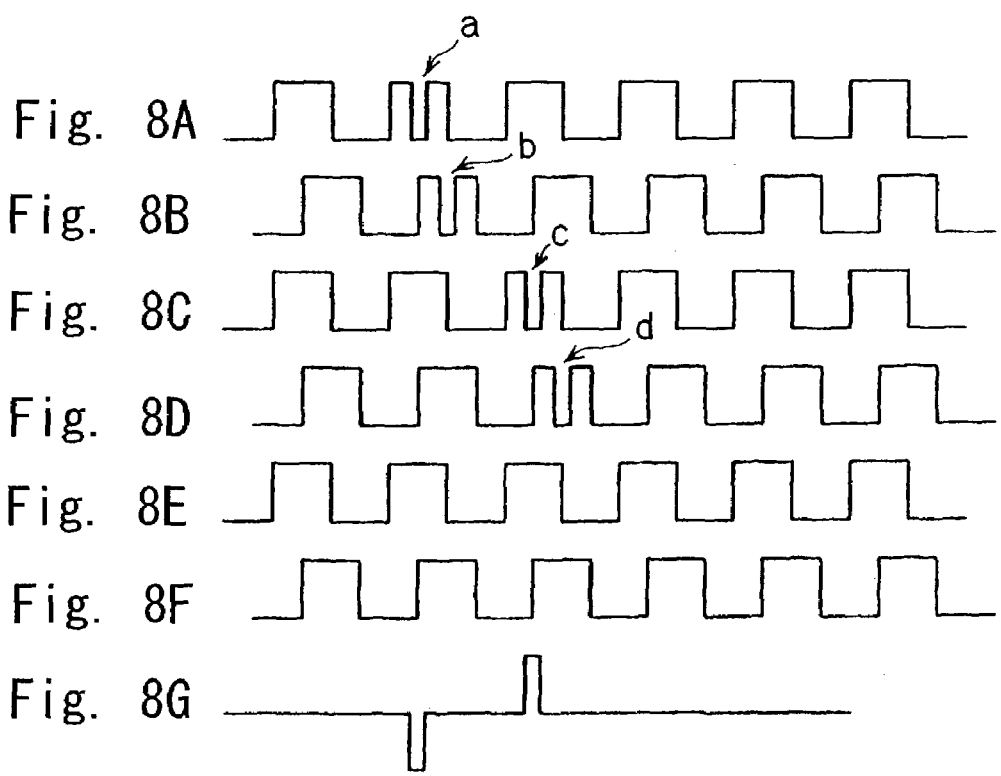
Fig. 8A
Fig. 8B
Fig. 8C
Fig. 8D
Fig. 8E
Fig. 8F
Fig. 8G

BEARING ASSEMBLY EQUIPPED WITH ROTATION SENSOR TO DETERMINE ROTATION AND POSITION OF ROTATING ELEMENT

BACKGROUND OF THE INVENTION

1. Field of the Invention

The present invention relates to a bearing assembly equipped with a rotation sensor capable of detecting the home position, which may be used in, for example, controlling a motor.

2. Description of the Prior Art

A revolution sensor for detecting the number of revolutions of, for example, a wheel is known, which includes a magnetic encoder fitted to a rotating element and having a plurality of opposite magnetic poles N and S defined therein so as to alternate with each other in a direction circumferentially thereof, and a magnetic sensor for detecting alternate passage of the opposite magnetic poles N and S of the magnetic encoder. The conventional rolling bearing assembly having such a revolution sensor built therein is shown in FIG. 13. Referring to FIG. 13, the rolling bearing assembly 31 includes an inner race 32 defining a rotatable member, an outer race 33 defining a stationary member and a plurality of rolling elements 34 operatively retained in position by a retainer or cage 35 and operatively interposed between the inner race 32 and the outer race 33. A magnetic encoder 36 of an annular configuration is fixed to the inner race 32, and a magnetic sensor 37 constructed of, for example, a Hall element is fixed to the outer race 33 and positioned radially outwardly of the magnetic encoder 36 so as to confront the latter. The magnetic sensor 37 is housed and resin-molded within a resin casing 38, and the resin casing 38 housing the magnetic sensor 37 is in turn mounted on the outer race 33 through a metallic casing 39 to thereby fix the magnetic sensor 37 to the outer race 33.

By so constructing the conventional rolling bearing assembly, as the inner race 32 rotates, the magnetic sensor 37 detects change in polarity of the magnetic encoder 36 to thereby provide an incremental rotation pulse signal descriptive of the number of revolutions of the inner race 32.

However, it has been found that with the conventional rotation sensor, even though the incremental rotation pulse signal can be obtained, no home position signal descriptive of the point of origin of revolution can be obtained. Because of this, an extra sensor dedicated to detect the home position is required for effectively accomplishing an initializing operation. The use of the extra sensor renders assemblage to be complicated, accompanied by complication of the structure. It is to be noted that although an absolute type has been suggested as a rotation detecting device, even this type has a problem in that the structure is complicated.

SUMMARY OF THE INVENTION

In view of the foregoing, the present invention is devised to provide a bearing assembly equipped with a rotation sensor capable of detecting a home position, of a kind in which not only can pulse signals for detection of the number of revolutions be obtained, but also a home position signal can be obtained, and which can be assembled easily and compact in size with a simplified structure.

In order to accomplish the foregoing object, one aspect of the present invention herein disclosed provides a bearing assembly equipped with a rotation sensor capable of detecting a home position, which includes a rotatable member and a non-rotatable member; a plurality of rolling elements interposed between the rotatable and non-rotatable members to facilitate rotation of the rotatable member relative to the non-rotatable member; a magnetic encoder secured to the non-rotatable member for rotation together therewith; and a rotation sensor assembly secured to the non-rotatable member and cooperable with the magnetic encoder. The magnetic encoder includes a first to-be-detected element magnetized to have a plurality of circumferentially equally spaced, opposite magnetic poles defined therein so as to alternate with each other in a direction circumferentially thereof. The first to-be-detected element also has a disturbing element provided at a predetermined site on a circumference of the magnetic encoder and given a magnetic characteristic for agitating a periodicity of the opposite magnetic poles in the to-be-detected element. The rotation sensor assembly includes first and second magnetic sensors for detecting the first to-be-detected element. These first and second magnetic sensors are spaced in a circumferential direction a distance greater than a circumferentially extending width of the disturbing element in which the periodicity of the opposite magnetic poles in the to-be-detected element is agitated, and are so positioned as to be held in substantially phase-matched relation with respect to a cycle of repetition of the opposite magnetic poles in the to-be-detected element.

According to this aspect of the present invention, detection of the magnetic poles of the to-be-detected element by the magnetic sensors is effective to provide pulse signals that can be used to detect the number of revolutions. Also, detection of the disturbing element disturbing the periodicity of the to-be-detected element by the magnetic sensor is effective to provide the home position signal. Thus, since the pulse signal for detection of the number of revolutions and the home position signal can be obtained from the same to-be-detected element, the bearing assembly can be simplified in structure, easily assembled and compacted in structure.

In the bearing assembly of the structure described above, the magnetic encoder may also include a second to-be-detected element magnetized to have opposite magnetic poles defined therein so as to alternate with each other in a direction circumferentially thereof. The opposite magnetic poles in the second to-be-detected element are equal in number and also in spacing to those in the first to-be-detected element. In such case, the rotation sensor assembly also includes a third magnetic sensor provided on the non-rotatable member for detecting the second to-be-detected element. This third magnetic sensor has about 90° phase difference relative to the other magnetic sensors. It is to be noted that the phase difference in this specification in connection with the arrangement of the magnetic sensors is intended to mean the difference in phase of the cycle of repetition of the opposite magnetic poles arranged in the to-be-detected element and, in other words, the difference in position that provides a difference of an electrical phase angle between detected signals of the magnetic sensors.

As discussed above, the provision of the third magnetic sensor having the substantially 90° phase difference allows detection of the direction of rotation based on the phase difference of the detected pulses.

Also, in the above discussed aspect of the present invention, assuming that the first and second magnetic sensors of the rotation sensor assembly altogether constitutes a first sensor pair, the rotation sensor assembly referred to above may also include a second sensor pair comprised of third and fourth magnetic sensors provided on the non-rotatable member for detecting the to-be-detected element. The third and fourth magnetic sensors of the second sensor pair are spaced in a circumferential direction a distance greater than the circumferentially extending width of the disturbing element in which the periodicity of the opposite magnetic poles in the to-be-detected element is agitated, and are so positioned as to be held in substantially phase-matched relation with a cycle of repetition of the opposite magnetic poles. The third and fourth magnetic sensors of the second sensor pair also have about 90° phase difference relative to the first sensor pair.

According to this aspect, since the first and second sensor pairs of the magnetic sensors have about 90° phase difference, the direction of rotation can be detected. Also, since two magnetic sensors are used for each of the first and second sensor pairs, the accuracy of detection can advantageously be increased.

The present invention in accordance with another aspect thereof also provides a bearing assembly equipped with a rotation sensor capable of detecting a home position, which includes a rotatable member and a non-rotatable member; a plurality of rolling elements interposed between the rotatable and non-rotatable members to facilitate rotation of the rotatable member relative to the non-rotatable member; a magnetic encoder secured to the rotatable member for rotation together therewith; and a rotation sensor assembly secured to the non-rotatable member and cooperable with the magnetic encoder. The magnetic encoder referred to above includes a first to-be-detected element magnetized to have a plurality of circumferentially equally spaced, opposite magnetic poles defined therein so as to alternate with each other in a direction circumferentially thereof, and a second to-be-detected element magnetized to have circumferentially equally spaced, opposite magnetic poles defined therein so as to alternate with each other in a direction circumferentially thereof. The opposite magnetic poles in the second to-be-detected element are circumferentially spaced the same distance as those in the first to be-detected element. The first to-be-detected element also has a disturbing element provided at a predetermined site on a circumference of the magnetic encoder and given a magnetic characteristic for agitating a periodicity of the opposite magnetic poles. The rotation sensor assembly used therein includes first and second magnetic sensors for detecting the first and second to-be-detected elements, respectively. The first and second magnetic sensors are so positioned as to be held in substantially phase-matched relation with a cycle of repetition of the opposite magnetic poles in the magnetic encoder.

According to the second mentioned aspect of the present invention, with only two magnetic sensors, the pulse signal for detection of the number of revolutions and the home position signal can be obtained. Because of this, the assemblage can be simplified and the structure can be compact in size.

The bearing assembly according to the second mentioned aspect of the present invention may additionally fix to the non-rotatable element a third magnetic sensor for detecting the second to-be-detected element, which third magnetic sensor has about 90° phase difference relative to the first and second magnetic sensors with respect to the cycle of repetition of the opposite magnetic poles in the magnetic encoder.

According to this feature, not only can the number of revolutions and the home position signal be detected, but the direction of rotation can also be detected.

Where the bearing assembly includes the first and second to-be-detected elements, the first and second to-be-detected elements may be defined at different portions of an integral to-be-detected member.

Formation of the first and second to-be-detected elements in the integral to-be-detected member is effective to facilitate simultaneous magnetization of those to-be-detected elements and, accordingly, the tact time required to accomplish the magnetization can advantageously be shortened to thereby reduce the cost of manufacture.

Also, where the bearing assembly includes the first and second to-be-detected elements, the first and second to-be-detected elements may have their opposite magnetic poles matched in phase with each other. This is particularly advantageous in that if the opposite magnetic poles of the first and second to-be-detected elements are phase-matched with each other, simultaneous magnetization of those to-be-detected elements is carried out more easily to thereby reduce the cost of manufacture.

Again, where the bearing assembly includes the first and second to-be-detected elements, a magnetic resistance enhancer may be defined at a location between the first and second to-be-detected elements. The use of the magnetic resistance enhancer is effective to avoid the possibility that a magnetic effect brought about by the disturbing element present at a portion of the first to-be-detected element of the magnetic encoder in the circumferential direction may extend to the second to-be-detected element, thereby increasing the accuracy of detection.

In any event, in the practice of the present invention, the plural magnetic sensors discussed above may be accommodated together within a casing while being held at predetermined positions. This is particularly advantageous in that the accuracy of relative positioning of the plural magnetic sensors used in the bearing assembly can advantageously be increased to thereby increase the accuracy of detection.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 4 is a fragmentary longitudinal sectional view of a bearing assembly having a rotation sensor assembly built therein in accordance with a second preferred embodiment of the present invention;

FIG. 5 is a fragmentary elevational view showing the structure of the rotation sensor assembly used in the bearing assembly shown in FIG. 4;

FIGS. 6A to 6D illustrate various output signals outputted from the rotation sensor assembly used in the bearing assembly of FIG. 4, which are shown in timed relation with each other;

FIG. 7 is a fragmentary elevational view showing the structure of a rotation sensor assembly used in the bearing assembly according to a third preferred embodiment of the present invention;

FIGS. 8A to 8G illustrate various output signals outputted from the rotation sensor assembly of FIG. 7, which are shown in timed relation with each other;

DETAILED DESCRIPTION OF THE EMBODIMENTS

Figure 1:
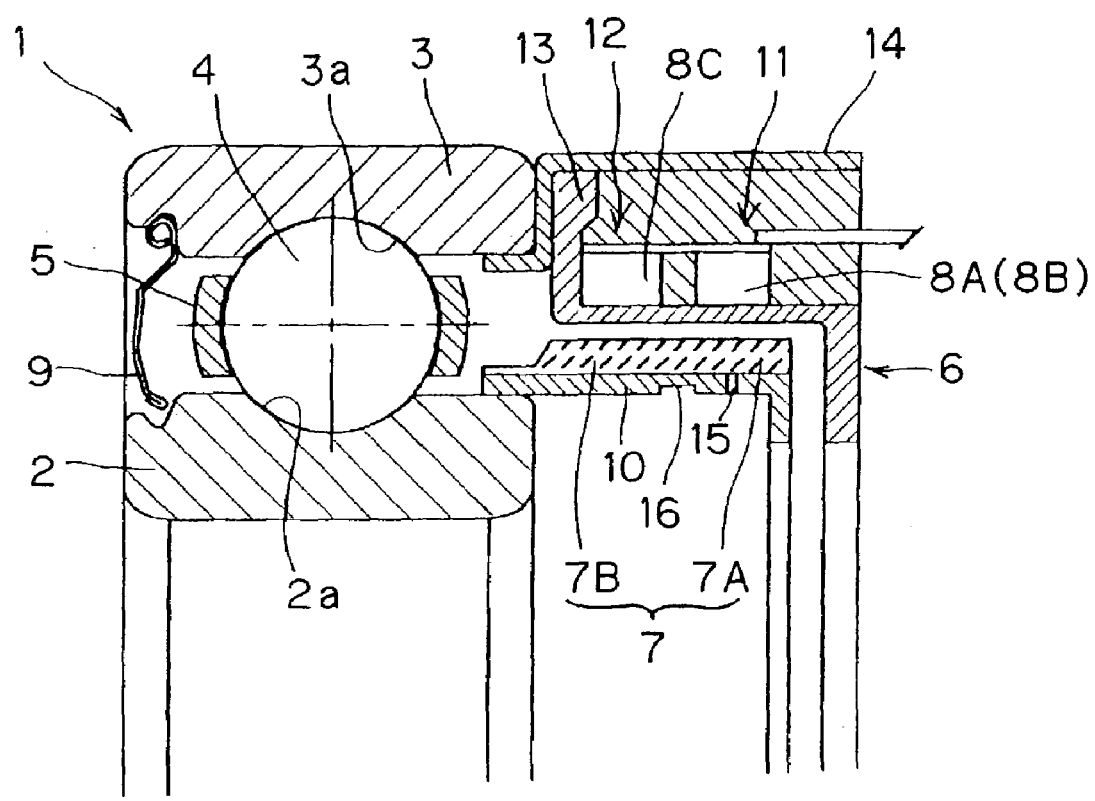
FIG. 1 is a fragmentary longitudinal sectional view of a bearing assembly having a rotation sensor built therein in accordance with a first preferred embodiment of the present invention.

Referring to FIGS. 1 to 3F, a first preferred embodiment of the present invention will be described. A bearing assembly 1 having a rotation sensor capable of detecting the home position, which is constructed in accordance with the first embodiment of the present invention, includes a rotatable member 2 and a non-rotatable member 3 with a plurality of rolling elements 4 interposed between the members 2 and 3 to permit the rotatable member 2 to be rotatable relative to the non-rotatable member 3. The bearing assembly also includes a rotation sensor assembly 6 having a magnetic encoder 7, mounted on the rotatable member 2, and magnetic sensors 8A, 8B and 8C mounted on the non-rotatable member 3. The rotatable member 2 and the non-rotatable member 3 may be an inner race and an outer race, respectively. The rotatable member 2 defining the inner race has its outer peripheral surface formed with a circumferentially extending raceway 2a of the rolling element defined therein and, on the other hand, the non-rotatable member 3 defining the outer race has its inner peripheral surface formed with a similarly circumferentially extending raceway 3a of the rolling element in alignment with the raceway 2a. The rolling elements are held in position by a retainer or cage 5. The rolling elements 4 may be either a ball or a roller, but the balls are employed in the illustrated embodiment. An annular space delimited between the rotatable member 2 and the non-rotatable member 3 has opposite open ends opening axially outwardly and one of the opposite open ends remote from the rotation sensor assembly 6 is tightly sealed by an annular sealing member 9.

Figure 2A:
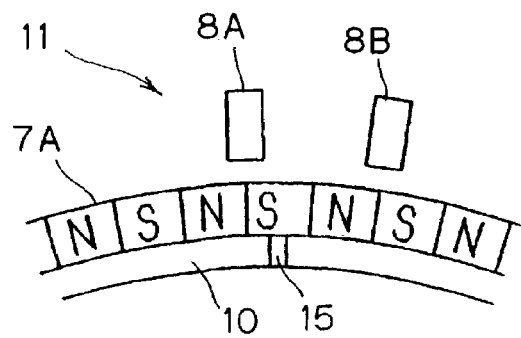
FIG. 2A is a fragmentary elevational view showing the structure of a first rotation sensor unit used in the bearing assembly shown in FIG. 1.
Figure 2B:
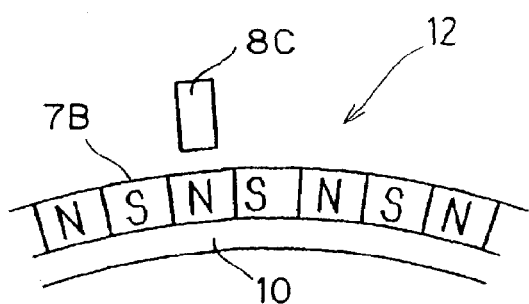
FIG. 2B is a fragmentary elevational view showing the structure of a second rotation sensor unit used in the bearing assembly shown in FIG. 1.

The magnetic encoder 7 forming a part of the rotation sensor assembly 6 is of a radial type and is of an annular configuration having a plurality of opposite magnetic poles deployed in a direction circumferentially thereof as shown in FIGS. 2A and 2B. More specifically, the magnetic encoder 7 is made up of an annular backing metal 10 and first and second to-be-detected elements 7A and 7B each mounted on an outer peripheral surface of the backing metal 10 and having a plurality of circumferentially equally spaced, opposite magnetic poles N and S defined therein so as to alternate with each other in a direction circumferentially thereof. This magnetic encoder 7 is fixedly mounted on the rotatable member 2 through the backing metal 10.

The first to-be-detected element 7A of the magnetic encoder 7 has a magnetic characteristic disturbing element 15 provided at a predetermined site on the circumference of the magnetic encoder 7, which disturbing element 15 has a magnetic characteristic effective to disturb or agitate the periodicity of the opposite magnetic poles N and S. This disturbing element 15 may be defined by, for example, forming one micropore in a portion of the backing metal 10 of the magnetic encoder 7. It is, however, to be noted in place of the micropore referred to above, the disturbing element 15 may be defined by forming a cutout in a portion of the backing metal 10 or by changing the magnetizing strength or the magnetizing direction of some of the magnetic poles S and N.

A magnetic resistance enhancer 16 effective to prevent a magnetic effect of the disturbing element 15 in the first to-be-detected element 7A from propagating to the second to-be-detected element 7B is provided between the first to-be-detected element 7A and the second to-be-detected element 7B of the magnetic encoder 7. This magnetic resistance enhancer 16 may be defined by a circumferential groove extending in a circumferential direction so as to partition the first and second to-be-detected elements 7A and 7B from each other and is defined in the backing metal 10.

Each of the magnetic sensors 8A to 8C may be in the form of, for example, a Hall element and generates a respective incremental pulse signal in dependence on cyclic change of the magnetic poles S and N in the magnetic encoder 7 as the rotatable member 2 carrying the magnetic encoder 7 rotates relative to the non-rotatable member 3 carrying the rotation sensor assembly 6. The magnetic sensors 8A and 8B, that are pared together, and the magnetic sensor 8C are positioned having been separated from each other in a direction axially of the rotation sensor assembly 6, and the paired magnetic sensors 8A and 8B cooperate with the first to-be-detected element 7A of the magnetic encoder 7 confronting the paired magnetic sensors 8A and 8B to define a first rotation sensor unit 11. On the other hand, the magnetic sensor 8C cooperates with the second to-be-detected element 7B confronting the magnetic sensor 8C to define a second rotation sensor unit 12. In this single magnetic encoder 7, the first to-be-detected element 7A and the second to-be-detected element 7B are juxtaposed relative to each other in the axial direction.

This axial juxtaposition of the first and second to-be-detected elements 7A and 7B in the single magnetic encoder 7 is advantageous in that the first and second to-be-detected elements 7A and 7B can readily be simultaneously magnetized to have the alternating magnetic poles and, accordingly, the tact time required to magnetize them can advantageously be reduced to thereby reduce the cost of manufacture. Also, the first to-be-detected element 7A has a cycle of repetition of the opposite magnetic poles matching with that of the magnetic poles of the second to-be-detected element 7B, that is, the first and second to-be-detected elements are in phase. Accordingly, magnetization of the first and second to-be-detected elements 7A and 7B can easily and readily be accomplished.

The magnetic sensors 8A to 8C are, after having been inserted into a resin casing 13, resin-molded within the resin casing 13 which is in turn fixed to the non-rotatable member 3 through a metallic casing 14. In this way, the magnetic sensors 8A to 8C are fixed to the non-rotating member 3.

FIG. 2A illustrates a relationship in position between the first to-be-detected element 7A and the paired magnetic sensors 8A and 8B whereas FIG. 2B illustrates a similar relationship in position between the second to-be-detected element 7B and the magnetic sensor 8C. While the paired magnetic sensors 8A and 8B are circumferentially spaced from each other a substantial distance that is greater than a circumferential width in which the periodicity of the opposite magnetic poles is agitated by the disturbing element 15, the paired magnetic sensors 8A and 8B are so positioned relative to each other that they can have the same cycle of repetition of the opposite magnetic poles matching with each other, that is, they operate in phase. On the other hand, the magnetic sensor 8A of the first rotation sensor unit 11 and the magnetic sensor 8C of the second rotation sensor unit 12 are so positioned as to have a phase difference of about 90°.

Figure 3A:
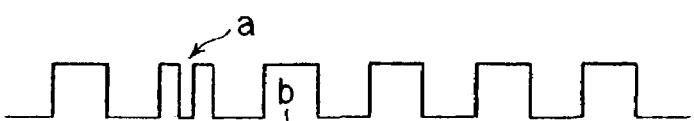
FIGS. 3A to 3F illustrate various output signals outputted from the rotation sensors in the bearing assembly, which are shown in timed relation with each other.
Figure 3B:
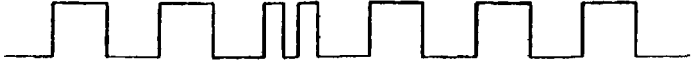
Figure 3C:
Figure 3D:
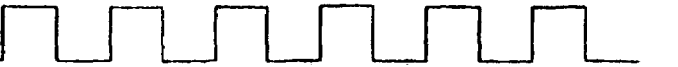
Figure 3E:
Figure 3F:

FIGS. 3A to 3F illustrate various waveforms of output signals from the rotation sensor assembly 6. Specifically, FIG. 3A illustrates the waveform of an output signal from the magnetic sensor 8A and FIG. 3B illustrates the waveform of an output signal from the magnetic sensor 8B. Respective portions of the waveforms indicated by a and b in FIGS. 3A and 3B are indicative of the magnetic characteristic disturbing element 15 in the first to-be-detected element 7A having been detected. FIG. 3C illustrates the waveform of a pulse signal (an A-phase pulse signal) obtained by the logical add (OR) between the output signal of the first magnetic sensor 8A, shown in FIG. 3A, and the output signal from the second magnetic sensor 8B shown in FIG. 3B. FIG. 3D illustrates the waveform of an output signal (a B-phase pulse signal) from the magnetic sensor 8C, and the number of revolutions can be detected based on those pulse signals. Since the two pulse signals indicative of the number of revolutions can be obtained, the certainty of detection of the number of revolutions can be increased. Also, considering that the magnetic sensor 8C has a 90° phase difference relative to the paired magnetic sensors 8A and 8B, the direction of rotation of the rotatable member 2 can be detected by detecting the phase difference between the A-phase pulse signal, shown in FIG. 3C, and the B-phase pulse signal shown in FIG. 3D. FIG. 3E represents the waveform of a home position signal obtained from a difference between the output signal from the first magnetic sensor 8A, shown in FIG. 3A, and the output signal from the second magnetic sensor 8B shown in FIG. 3B. By designing and incorporating an electric circuit operable to extract only a positive or negative waveform portion of the home position signal, it is possible to obtain a signal waveform of one pulse per revolution. It is to be noted that if the home position is recognized by detection of both of the positive and negative waveform portions, it is possible to increase the reliability of detection relative to noises. Although, in the example shown in FIG. 3E, the home position signal has been obtained from the difference of the analog signals, it can be obtained even from the difference of digital signals. In other words, since a signal waveform shown in FIG. 3F can be obtained from an exclusive OR between the signals of the respective waveforms shown in FIGS. 3A and 3C, this signal can be used as the home position signal.

With the bearing assembly 1 equipped with the rotation sensor according to the foregoing embodiment, not only can the number of revolutions be detected, but the home position and the direction of rotation can also be detected. Accordingly, the bearing assembly 1 of the foregoing embodiment does not require the use of separate sensors for detecting the number of revolutions and the home position, respectively, such as hitherto required. For this reason, the bearing assembly 1 equipped with the rotation sensor can advantageously be assembled easily in a simple and compact structure.

In describing the foregoing embodiment, the magnetic characteristic disturbing element 15 has been described as operable to agitate the magnetic field within the single width of the magnetic pole. However, the agitation of the magnetic field may take place within a width larger than the width of the single magnetic pole. In such case, the circumferential space between the first and second magnetic sensors 8A and 8B has to be of a value greater than the width in which the magnetic field can be agitated, so that similar effects can be obtained.

Also, in order to enhance the positioning accuracy of the magnetic sensors 8A to 8C relative to each other, those three magnetic sensors 8A to 8C are preferably packaged in a single receptor such as the resin casing 13 shown and described in connection with the foregoing embodiment.

FIG. 4 illustrates a longitudinal sectional view of a portion of the bearing assembly according to a second embodiment of the present invention. The bearing assembly 1 equipped with the rotation sensor capable of detecting the home position in accordance with this second embodiment is substantially similar to that shown in and described with reference to FIGS. 1 to 3F, except that of the first and second rotation sensor units 11 and 12 forming the rotation sensor assembly 6, the second rotation sensor unit 12 is dispensed with. As best shown in FIG. 5, the first and second sensors 8A and 8B paired to form the first rotation sensor unit 11 and employed in the practice of the second embodiment are of the same structure as those employed in the first embodiment in that the first and second sensors 8A and 8B are so positioned as to be held in substantially phase-matched relation with the cycle of repetition of the opposite magnetic poles and also in that the magnetic characteristic disturbing element 15 is employed. It is to be noted that since in this second embodiment the use of the second rotation sensor unit 12 is dispensed with, the magnetic resistance enhancer 16 of the backing metal 10 particularly shown in FIG. 1 and described in connection with the previously described embodiment is also dispensed with. Other structural features than those described above are similar to those shown in and described in connection with the previously described embodiment.

FIGS. 6A to 6D illustrate various waveforms of the output signals outputted from the rotation sensor assembly 6. Specifically, FIG. 6A represents the waveform of the output signal from the magnetic sensor 8A and FIG. 6B represents the waveform of the output signal from the magnetic sensor 8B. Respective portions of the waveforms indicated by a and b in FIGS. 6A and 6B are indicative of the magnetic characteristic disturbing element 15 in the first to-be-detected element 7A having been detected. FIG. 6C illustrates the waveform of a pulse signal obtained by the logical add (OR) between the output signal of the first magnetic sensor 8A, shown in FIG. 6A, and the output signal from the second magnetic sensor 8B shown in FIG. 6B. The number of revolutions can be detected based on those pulse signals. FIG. 6D represents the waveform of a home position signal obtained from a difference between the output signal from the first magnetic sensor 8A, shown in FIG. 6A, and the output signal from the second magnetic sensor 8B shown in FIG. 6B.

According to the second embodiment, although no direction of rotation can be detected, the rotation sensor assembly 6 is made up of only the rotation sensor unit 11 and, therefore, as compared with the first embodiment of the present invention, the structure can be simplified. Since even in this second embodiment positive and negative pulses can be obtained for detection of the home position, the reliability of detection of the home position relative to noises can be increased advantageously.

FIG. 7 illustrates a third preferred embodiment of the present invention. The bearing assembly equipped with the rotation sensor capable of detecting the home position according to the third embodiment is substantially similar to that according to the second embodiment shown in and described with reference to FIG. 4, except that the rotation sensor assembly 6 employed in the bearing assembly shown in FIG. 7 makes use of four magnetic sensors. Specifically, the rotation sensor assembly 6 includes a first pair of magnetic sensors 8A1 and 8A2 and a second pair of the magnetic sensors 8B1 and 8B2. The circumferential space between the first pair of the magnetic sensors 8A1 and 8A2 and the second pair of the magnetic sensors 8B1 and 8B2 is of a distance greater than the circumferential width of the magnetic characteristic disturbing element 15.

Also, the first and second pairs of the magnetic sensors are so positioned relative to each other that each of the space between the magnetic sensor 8A1 of the first pair and the magnetic sensor 8B1 of the second pair and the space between the magnetic sensor 8A2 of the first pair and the magnetic sensor 8B2 of the second pair can be rendered equal to each other. In other words, the magnetic sensors 8A1 and 8B1 operate in phase while the magnetic sensors 8A2 and 8B2 operate in phase. On the other hand, with respect to the cycle of repetition of the opposite magnetic poles, the magnetic sensors 8A1 and 8A2 of the first pair are so positioned relative to each other that they have a phase difference of about 90° and, similarly, the magnetic sensors 8B1 and 8B2 of the second pair are so positioned relative to each other that they have a phase difference of about 90°. Other structural features than those described above are similar to those shown and described in connection with the second embodiment with reference to FIGS. 4 to 6D.

FIGS. 8A to 8G illustrate various waveforms of output signals from the rotation sensor assembly 6 employed in the third embodiment. Specifically, FIG. 8A illustrates the waveform of an output signal from the magnetic sensor 8A1 of the first pair; FIG. 8B illustrates the waveform of an output signal from the magnetic sensor 8A2 of the first pair; FIG. 8C illustrates the waveform of an output signal from the magnetic sensor 8B1 of the second pair; and FIG. 8D illustrates the waveform of an output signal from the magnetic sensor 8B2 of the second pair. Respective portions of the waveforms indicated by a, b, c and d in FIGS. 8A to 8D are indicative of the magnetic characteristic disturbing element 15 in the first to-be-detected element 7A having been detected. FIG. 8E illustrates the waveform of a pulse signal (an A-phase pulse signal) obtained by the logical add (OR) between the output signals of the magnetic sensor 8A1 and 8B1 shown respectively in FIGS. 8A and 8C while FIG. 8F illustrates the waveform of a pulse signal (a B-phase pulse signal) obtained by the logical add (OR) between the output signals of the magnetic sensors 8A2 and 8B2 shown respectively in FIGS. 8B and 8D. The number of revolutions can be detected based on those pulse signals. Also, the magnetic sensors 8A1 and 8A2 of the first pair and the magnetic sensors 8B1 and 8B2 of the second pair are so positioned as to be matched in phase with each other while the magnetic sensors 8A1 and 8B1 and the magnetic sensors 8A2 and 8B2 are so positioned as to have a 90° phase difference respectively as discussed above, accordingly it is possible to detect the direction of rotation of the rotatable member 2 by detecting a phase difference between the A-phase pulse signal and the B-phase pulse signal. FIG. 8G illustrates the waveform of a home position signal obtained from a difference between the output signal from the magnetic sensor 8A1 of the first pair, shown in FIG. 8A, and the output signal from the magnetic sensor 8B1 of the second pair shown in FIG. 8C. It is to be noted that the home position signal can also be obtained from a difference between the output signal from the magnetic sensor 8A2 of the first pair, shown in FIG. 8B, and the output signal from the magnetic sensor 8B2 of the second pair shown in FIG. 8D.

The third embodiment of the present invention is particularly advantageous in that the use of only one to-be-detected element, that is, the to-be-detected element 7A is sufficient to detect the number of revolutions, the home position and the direction of rotation and, accordingly, the assembly can be fabricated compact in size. Although the number of the magnetic sensors used therein is increased to four, they are arranged in a circumferential direction and, accordingly, the space for installation of those magnetic sensors can easily be secured. In addition, a highly reliable detection of the home position relative to noises can be achieved with the positive and negative pulses.

Figure 9A:
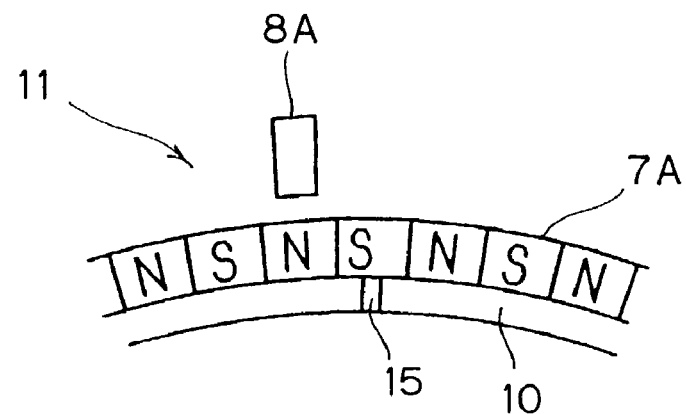
FIG. 9A is a fragmentary elevational view showing the structure of a first rotation sensor unit used in the bearing assembly according to a fourth preferred embodiment of the present invention.
Figure 9B:
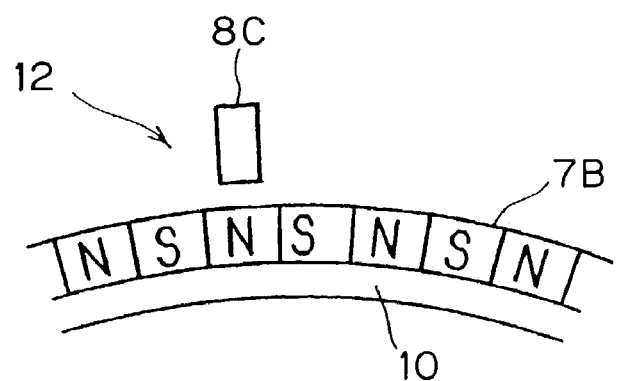
FIG. 9B is a fragmentary elevational view showing the structure of a second rotation sensor unit used in the bearing assembly according to the fourth preferred embodiment of the present invention.

FIGS. 9A and 9B illustrate a fourth preferred embodiment of the present invention. The bearing assembly equipped with the rotation sensor capable of detecting the home position in accordance with this fourth embodiment is substantially similar to that shown in and described with reference to FIGS. 1 to 3F, except that of the first and second rotation sensor units 11 and 12 forming the rotation sensor assembly 6, only one of the magnetic sensors 8A and 8B of the first rotation sensor unit 11 is dispensed with. More specifically, the first rotation sensor unit 11 employed therein is made up of the first to-be-detected element 7A of the magnetic encoder 7 and the single magnetic sensor 8A confronting the first to-to-be detected element 7A. The magnetic sensor 8A of the first rotation sensor unit 11 and the magnetic sensor 8C of the second rotation sensor unit 12 are so positioned as to be held in substantially phase-matched relation with the cycle of repetition of the opposite magnetic poles. The magnetic characteristic disturbing element 15 is similarly provided on the first to-be-detected element 7A of the magnetic encoder 7 as provided in the bearing assembly 1 in accordance with the first preferred embodiment. Other structural features than those described above are similar to those shown in and described in connection with the previously described first embodiment.

Figure 10A:
FIGS. 10A to 10C illustrate various output signals outputted from the rotation sensor assembly used in the bearing assembly according to the fourth preferred embodiment of the present invention.
Figure 10B:
Figure 10C:

FIGS. 10A to 10C illustrate various waveforms of the output signals outputted from the rotation sensor assembly 6. Specifically, FIG. 10A represents the waveform of the output signal from the magnetic sensor 8A and FIG. 10B represents the waveform of the output signal from the magnetic sensor 8C. A portion of the waveform indicated by a in FIG. 10A is indicative of the magnetic characteristic disturbing element 15 in the first to-be-detected element 7A having been detected.

In this embodiment shown in FIGS. 9A and 9B, the number of revolutions can be detected based on the output signal of the magnetic sensor 8C, shown in FIG. 10B. FIG. 10C represents the waveform of a home position signal obtained from a difference between the output signal from the magnetic sensor 8A, shown in FIG. 10A, and the output signal from the magnetic sensor 8C shown in FIG. 10B. In such case, although the direction of rotation cannot be detected, the assembly can advantageously be simplified in structure. Where, for example, the bearing assembly in accordance with this fourth embodiment is used in detecting the number of revolutions of an automobile wheel, the direction of rotation of such automobile wheel may be detected by the use of a separate direction detector and, therefore, the rotation sensor assembly 6 used in such bearing assembly should work satisfactorily even though the direction of rotation cannot be detected.

Figure 11A:
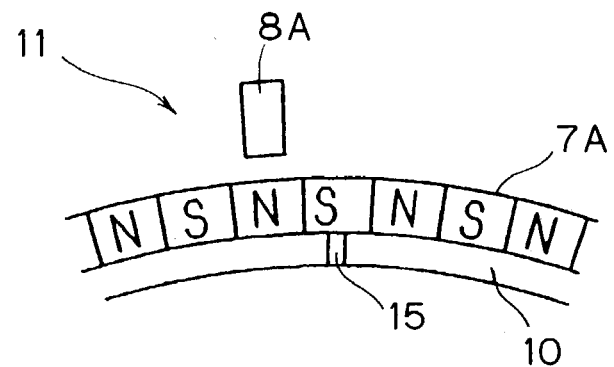
FIG. 11A is a fragmentary elevational view showing the structure of a first rotation sensor unit used in the bearing assembly having a rotation sensor built therein according to a fifth preferred embodiment of the present invention.
Figure 11B:
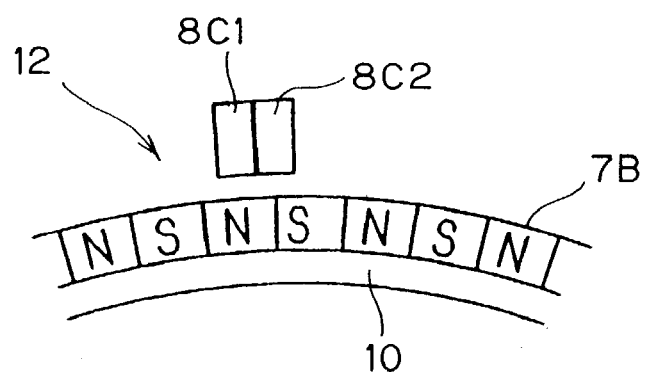
FIG. 11B is a fragmentary elevational view showing the structure of a second rotation sensor unit used in the bearing assembly according to the fifth preferred embodiment of the present invention.

FIGS. 11A and 11B illustrate a fifth preferred embodiment of the present invention. The bearing assembly equipped with the rotation sensor capable of detecting the home position in accordance with this fifth embodiment is substantially similar to that shown in and described with reference to FIGS. 9A to 10C, except that of the first and second rotation sensor units 11 and 12 forming the rotation sensor assembly 6, the second rotation sensor unit 12 is made up of two magnetic sensors identified respectively by 8C1 and 8C2. As best shown in FIG. 11B, the magnetic sensors 8C1 and 8C2 of the second rotation sensor unit 12 are disposed in side-by-side fashion in a direction circumferentially of the magnetic encoder 7. Also, the magnetic sensor 8A of the first rotation sensor unit 11 and the magnetic sensor 8C1 of the second rotation sensor unit 12 are so positioned as to be held in substantially phase-matched relation with the cycle of repetition of the opposite magnetic poles, while the magnetic sensors 8C1 and 8C2 of the second rotation sensor unit 12 are so positioned as to have a phase difference of about 90°. Other structural features than those described above are similar to those shown in and described in connection with the previously described fourth embodiment.

Figure 12A:
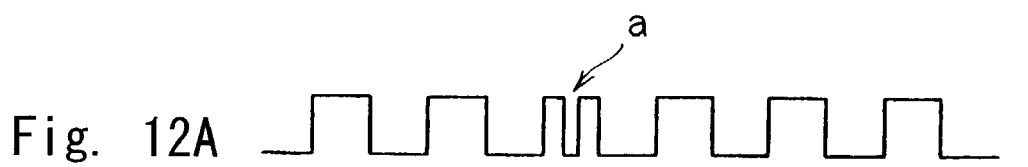
FIGS. 12A to 12D illustrate various output signals outputted from the rotation sensor assembly used in the bearing assembly according to the fifth preferred embodiment of the present invention.
Figure 12B:
Figure 12C:

FIGS. 12A to 12D illustrate various waveforms of the output signals outputted from the rotation sensor assembly 6 shown. Specifically, FIG. 12A represents the waveform of the output signal from the magnetic sensor 8A; FIG. 12B represents the waveform of an output signal from the magnetic sensor 8C1; and FIG. 12C represents the waveform of an output signal from the magnetic sensor 8C2. A portion of the waveform indicated by a in FIG. 12A is indicative of the magnetic characteristic disturbing element 15 in the first to-be-detected element 7A having been detected.

Figure 12D:
Figure 13:
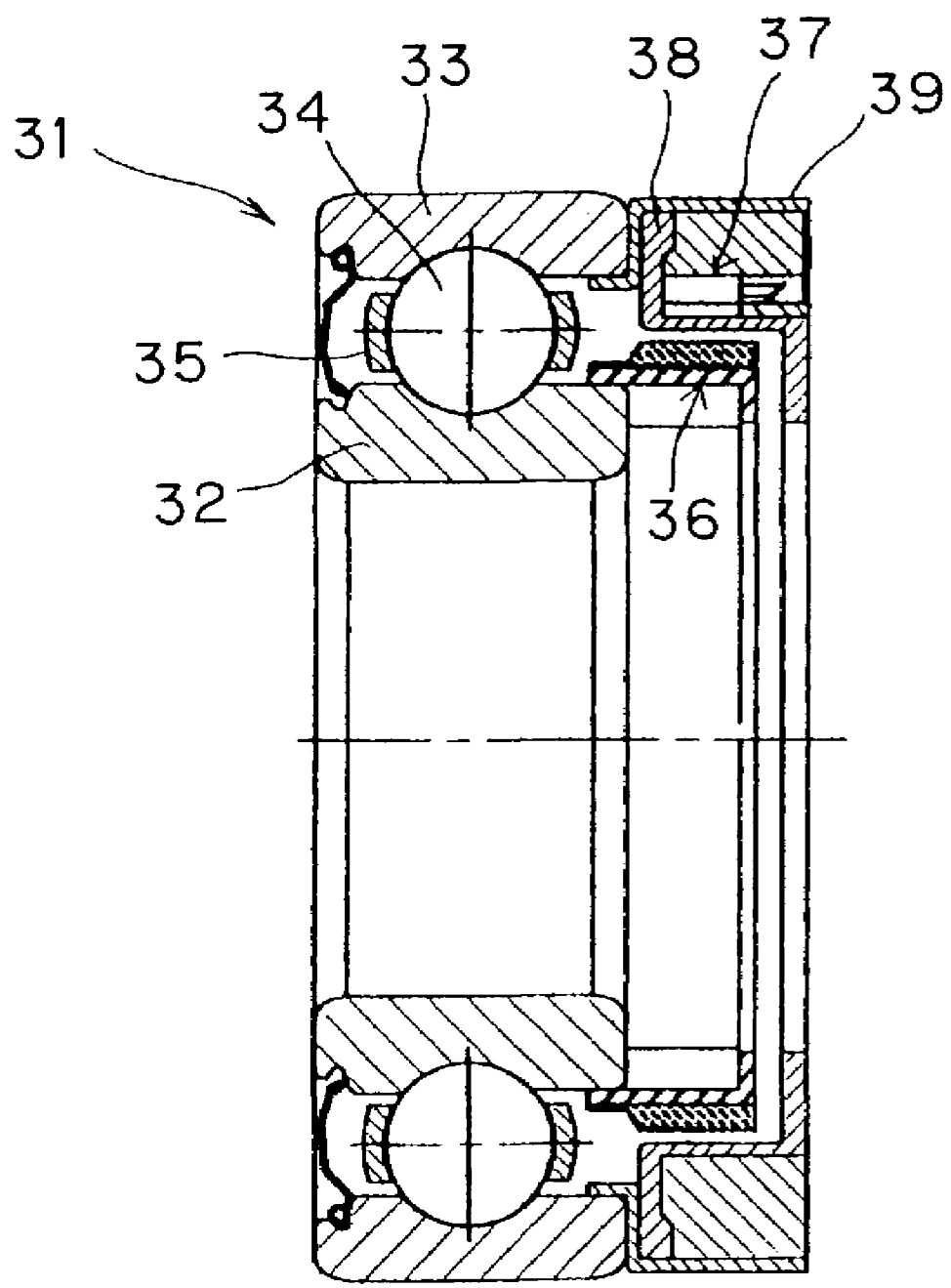
FIG. 13 is a fragmentary longitudinal sectional view showing the conventional rolling bearing assembly.

In this embodiment shown in FIGS. 11A and 11B, the number of revolutions can be detected based on the output signal of the magnetic sensor 8C1, shown in FIG. 12B or the output signal of the magnetic sensor 8C2 shown in FIG. 12C, and the direction of rotation can be detected based on a phase difference between those output signals of the magnetic sensors 8C1 and 8C2. FIG. 12D represents the waveform of a home position signal obtained from a difference between the output signal from the magnetic sensor 8A, shown in FIG. 12A, and the output signal from the magnetic sensor 8C1 shown in FIG. 12B.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the various preferred embodiments of the present invention, the magnetic encoder 7 forming a part of the rotation sensor assembly 6 has been shown and described as the radial type in which the opposite magnetic poles S and N of the magnetic encoder 7 confronts the magnetic sensors in a direction radially of the rotation sensor assembly 6, the present invention can be equally applied to an axial type in which the opposite magnetic poles S and N of the magnetic encoder 7 confronts the magnetic sensors in a direction axially of the rotation sensor assembly 6, Accordingly, such changes and modifications are, unless they depart from the scope of the present invention as delivered from the claims annexed hereto, to be construed as included therein.

What is claimed is:

1. A bearing assembly equipped with a rotation sensor capable of detecting a home position, said bearing assembly comprising:

a rotatable member and a non-rotatable member;

a plurality of rolling elements interposed between the rotatable and non-rotatable members to facilitate rotation of the rotatable member relative to the non-rotatable member;

a magnetic encoder secured to the rotatable member for rotation together therewith, said magnetic encoder including a to-be-detected element magnetized to have a plurality of circumferentially equally spaced, opposite magnetic poles defined therein so as to alternate with each other in a direction circumferentially thereof, said to-be-detected element also having a disturbing element provided at a predetermined site on a circumference of the magnetic encoder and given a magnetic characteristic for agitating a periodicity of the opposite magnetic poles; and a rotation sensor assembly secured to the non-rotatable member and cooperable with the magnetic encoder and including first and second magnetic sensors for detecting the first to-be-detected element, said first and second magnetic sensors being spaced in a circumferential direction a distance greater than a circumferentially extending width of the disturbing element in which the periodicity of the opposite magnetic poles in the first to-be-detected element is agitated, said first and second magnetic sensors being so positioned as to be held in substantially phase-matched relation with a cycle of repetition of the opposite magnetic poles.

2. The bearing assembly as claimed in claim 1, wherein the magnetic encoder also includes a second to-be-detected element magnetized to have opposite magnetic poles defined therein so as to alternate with each other in a direction circumferentially thereof, the opposite magnetic poles in the second to-be-detected element being equal in number and also in spacing to that in the to-be-detected element, that is, the first to-be-detected element, and wherein the rotation sensor assembly also includes a third magnetic sensor provided on the non-rotatable member for detecting the second to-be-detected element, the third magnetic sensor having about 9° phase difference relative to the other magnetic sensors.

3. The bearing assembly as claimed in claim 2, wherein the first and second to-be-detected elements are defined at different portions of an integral to-be-detected member.

4. The bearing assembly as claimed in claim 2, wherein the first and second to-be-detected elements have their opposite magnetic poles matched in phase with each other.

5. The bearing assembly as claimed in claim 2, further comprising a magnetic resistance enhancer located between the first and second to-be-detected elements.

6. The bearing assembly as claimed in claim 1, wherein the first and second magnetic sensors of the rotation sensor assembly altogether constitutes a first sensor pair and the rotation sensor assembly includes a second sensor pair comprised of third and fourth magnetic sensors provided on the non-rotatable member for detecting the to-be-detected element, said third and fourth magnetic sensors of the second sensor pair being spaced in a circumferential direction a distance greater than the circumferentially extending width of the disturbing element in which the periodicity of the opposite magnetic poles in the to-be-detected element is agitated, said third and fourth magnetic sensors of the second sensor pair being so positioned as to be held in substantially phase-matched relation with a cycle of repetition of the opposite magnetic poles and having about 90° phase difference relative to the first sensor pair.

7. The bearing assembly as claimed in claim 1, wherein the plural magnetic sensors are accommodated together within a casing while being held at predetermined positions.

8. A bearing assembly equipped with a rotation sensor capable of detecting a home position, said bearing assembly comprising:
   a rotatable member and a non-rotatable member;
   a plurality of rolling elements interposed between the rotatable and non-rotatable members to facilitate rotation of the rotatable member relative to the non-rotatable member;
   a magnetic encoder secured to the rotatable member for rotation together therewith, said magnetic encoder including a first to-be-detected element magnetized to have a plurality of circumferentially equally spaced, opposite magnetic poles defined therein so as to alternate with each other in a direction circumferentially thereof, said first to-be-detected element also having a disturbing element provided at a predetermined site on a circumference of the magnetic encoder and given a magnetic characteristic for agitating a periodicity of the opposite magnetic poles, and a second to-be-detected element magnetized to have opposite magnetic poles defined therein so as to alternate with each other, said opposite magnetic poles in the second to-be-detected element being circumferentially spaced the same distance as those in the first-to-be detected element; and
   a rotation sensor assembly secured to the non-rotatable member and cooperable with the magnetic encoder and including first and second magnetic sensors for detecting the first and second to-be-detected elements, respectively, said first and second magnetic sensors being so positioned as to be held in substantially phase-matched relation with a cycle of repetition of the opposite magnetic poles in the magnetic encoder.

9. The bearing assembly as claimed in claim 8, further comprising a third magnetic sensor provided on the non-rotatable member for detecting the second to-be-detected element, said third magnetic sensor being so positioned to have a phase difference of about 90° relative to the first and second magnetic sensors with respect to the cycle of repetition of the opposite magnetic poles in the magnetic encoder.

10. The bearing assembly as claimed in claim 8, wherein the plural magnetic sensors are accommodated together within a casing while being held at predetermined positions.

11. The bearing assembly as claimed in claim 8, wherein the first and second to-be-detected elements are defined at different portions of an integral to-be-detected member.

12. The bearing assembly as claimed in claim 8, wherein the first and second to-be-detected elements have their opposite magnetic poles matched in phase with each other.

13. The bearing assembly as claimed in claim 8, further comprising a magnetic resistance enhancer located between the first and second to-be-detected elements.

* * * * *

UNITED STATES PATENT AND TRADEMARK OFFICE
CERTIFICATE OF CORRECTION

| | | |
|---|---|---|
| PATENT NO. | : 6,956,367 B2 | |
| APPLICATION NO. | : 10/387563 | |
| DATED | : October 18, 2005 | |
| INVENTOR(S) | : Yoshio Fujikawa et al. | |

It is certified that error appears in the above-identified patent and that said Letters Patent is hereby corrected as shown below:

Title Page, Item (75) (Inventors), Line 4, after "(JP)" delete "x".
Column 12, Line 66, delete "9°" and insert -- 90° -- therefor.
Column 14, Line 11, delete "first-to-be detected" and insert -- first to-be-detected -- therefor.

Signed and Sealed this

Eighteenth Day of July, 2006

JON W. DUDAS
*Director of the United States Patent and Trademark Office*